April 25, 1967  S. O. SHIFFER  3,315,785
AUTOMATED TILE HANDLING SYSTEM
Filed Oct. 14, 1964  10 Sheets-Sheet 8
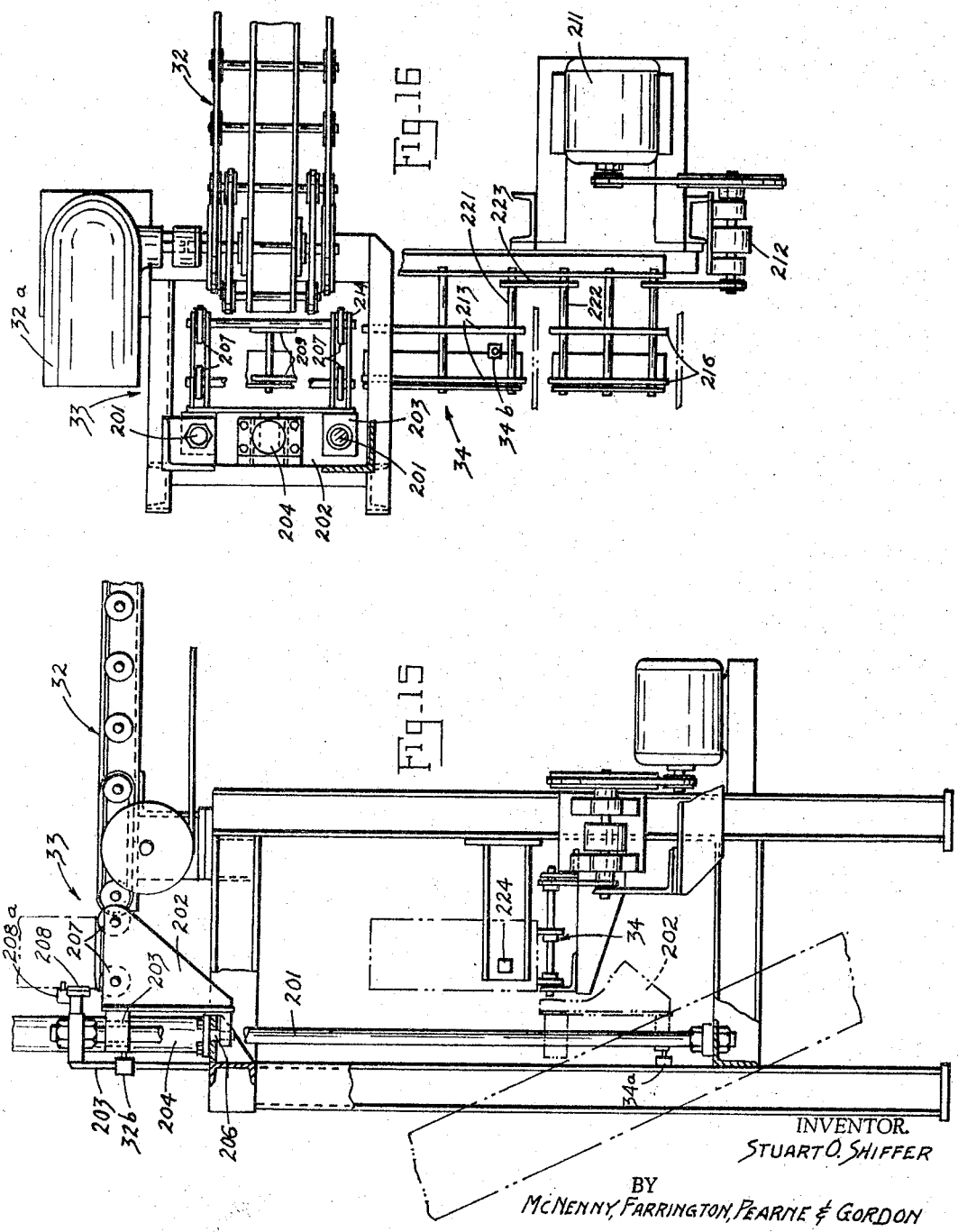

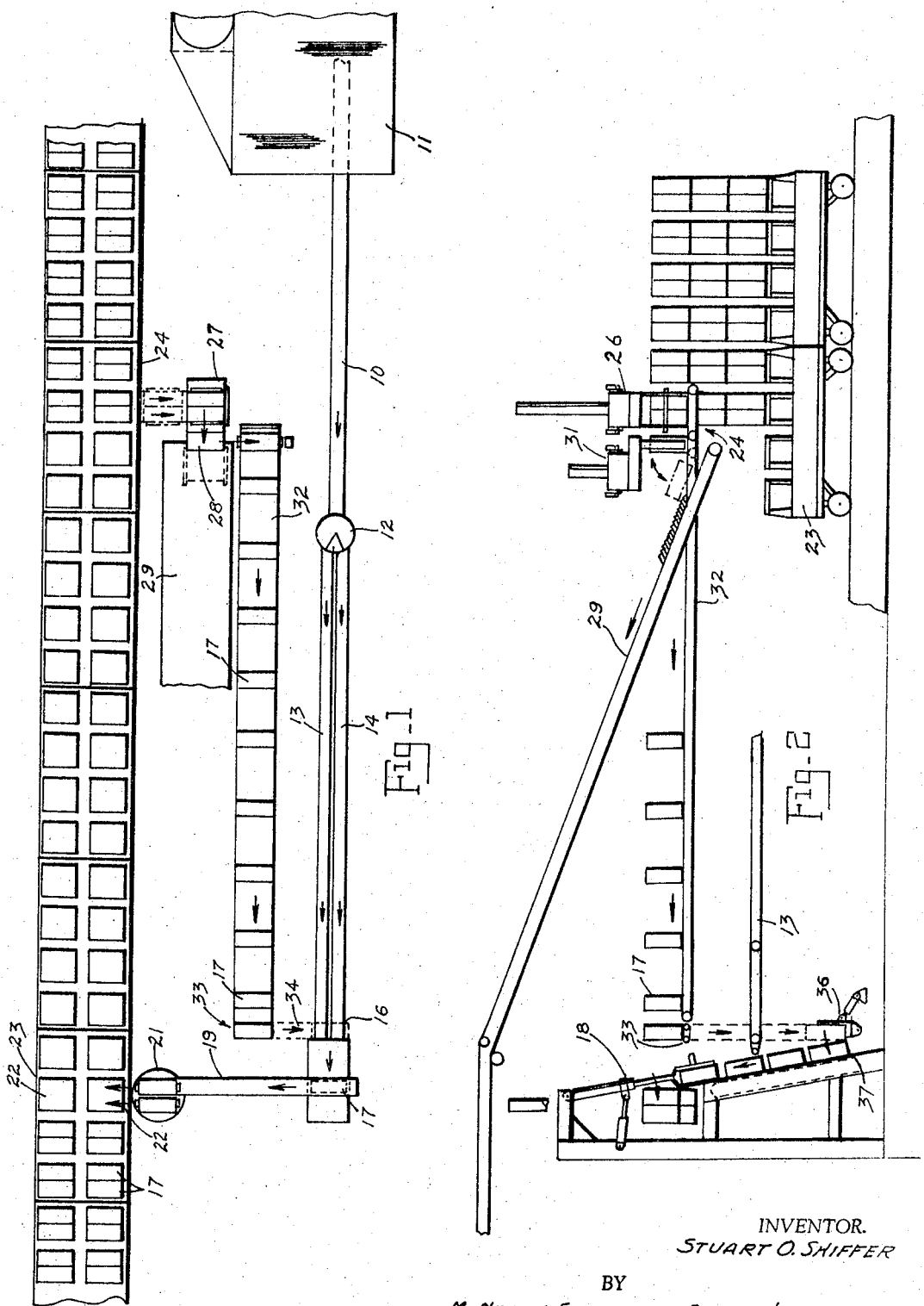

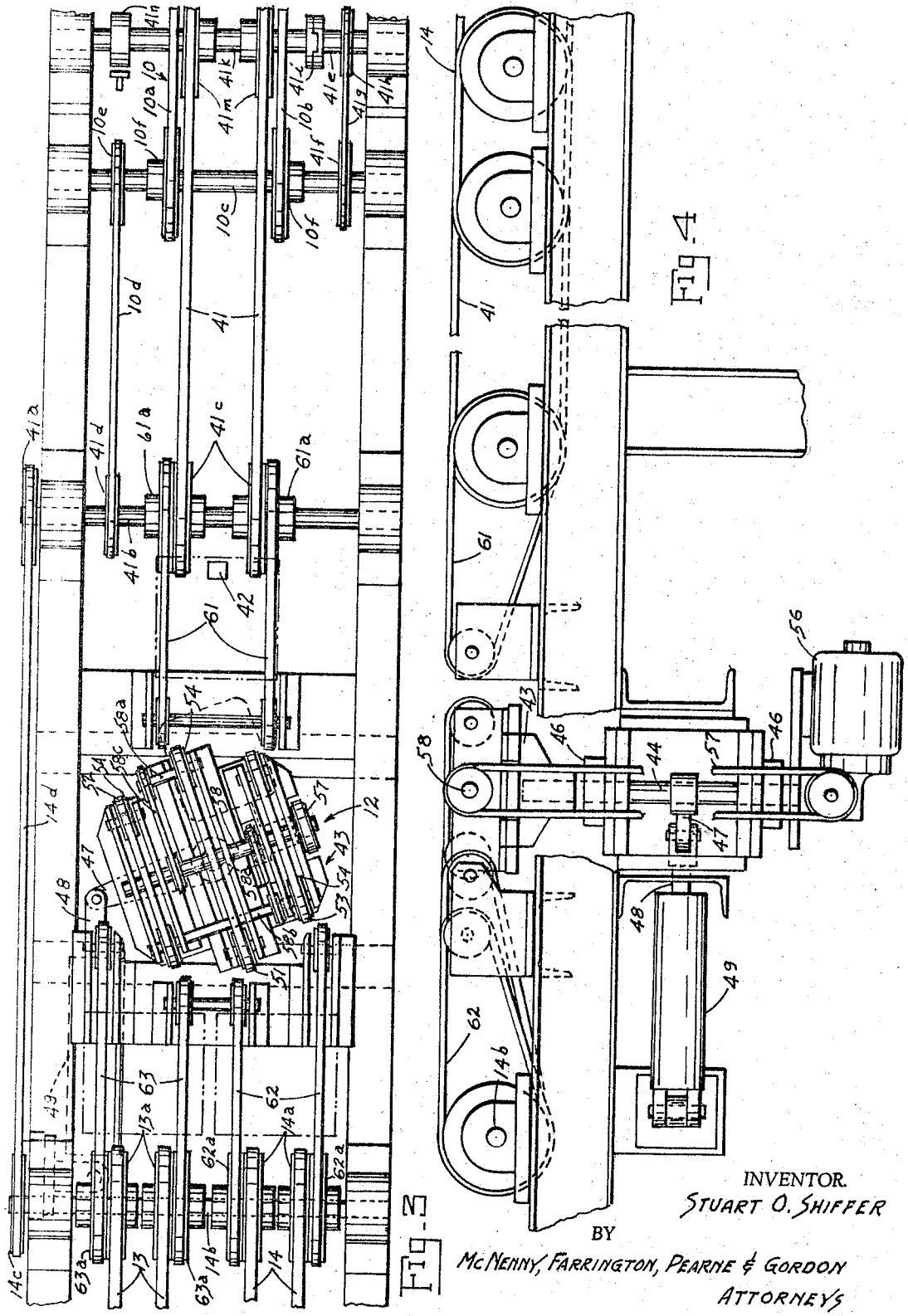

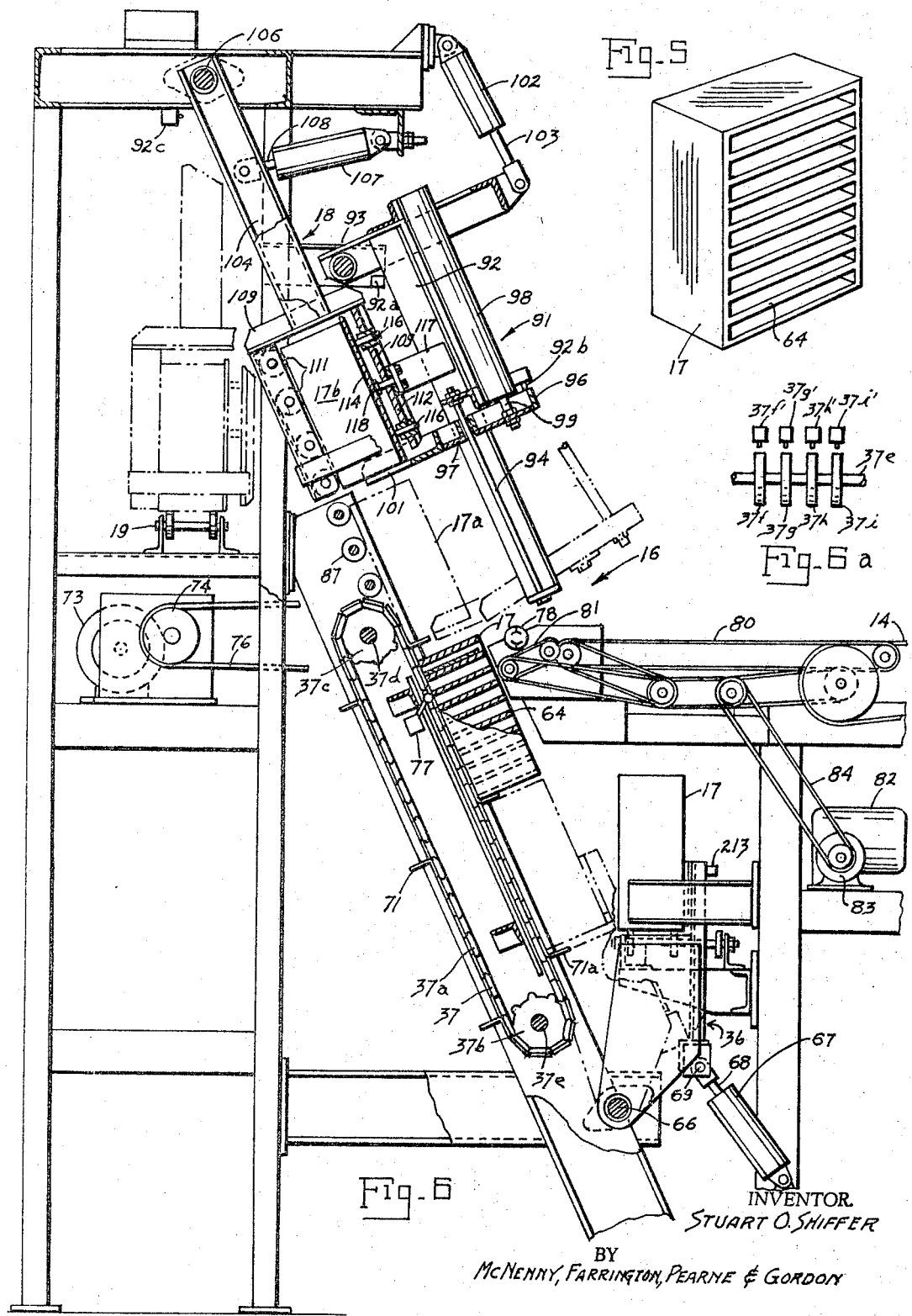

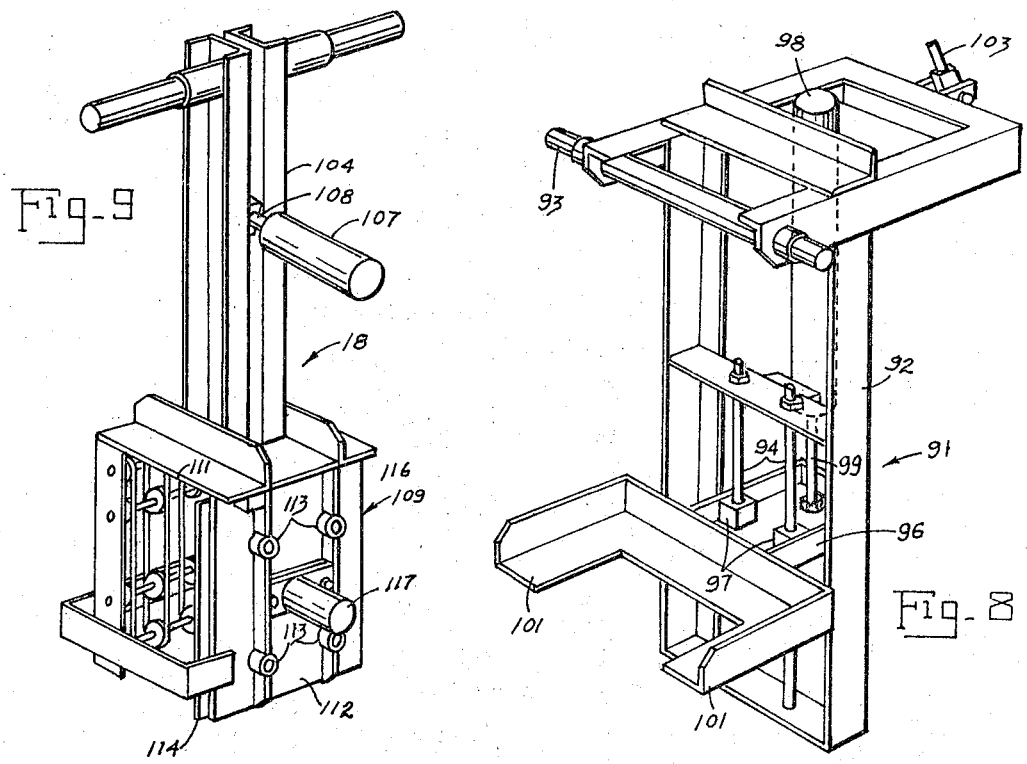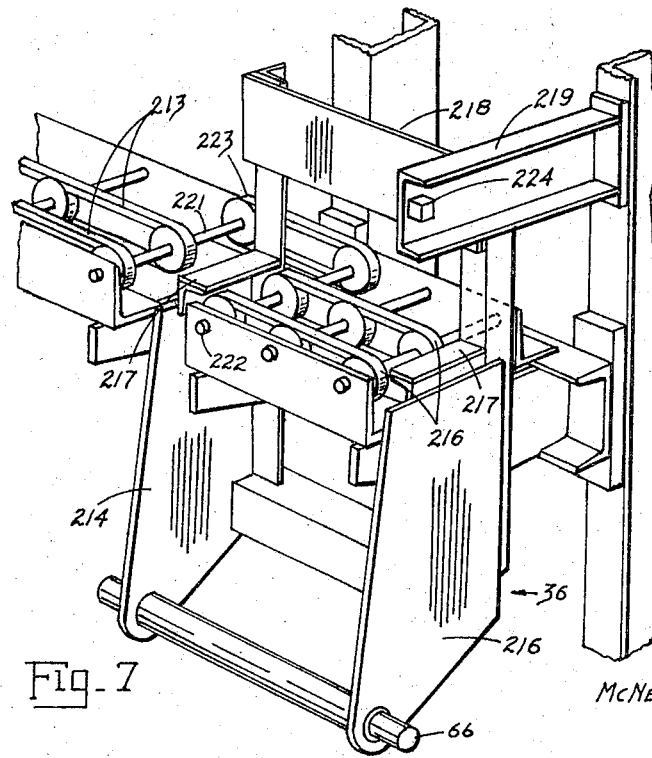

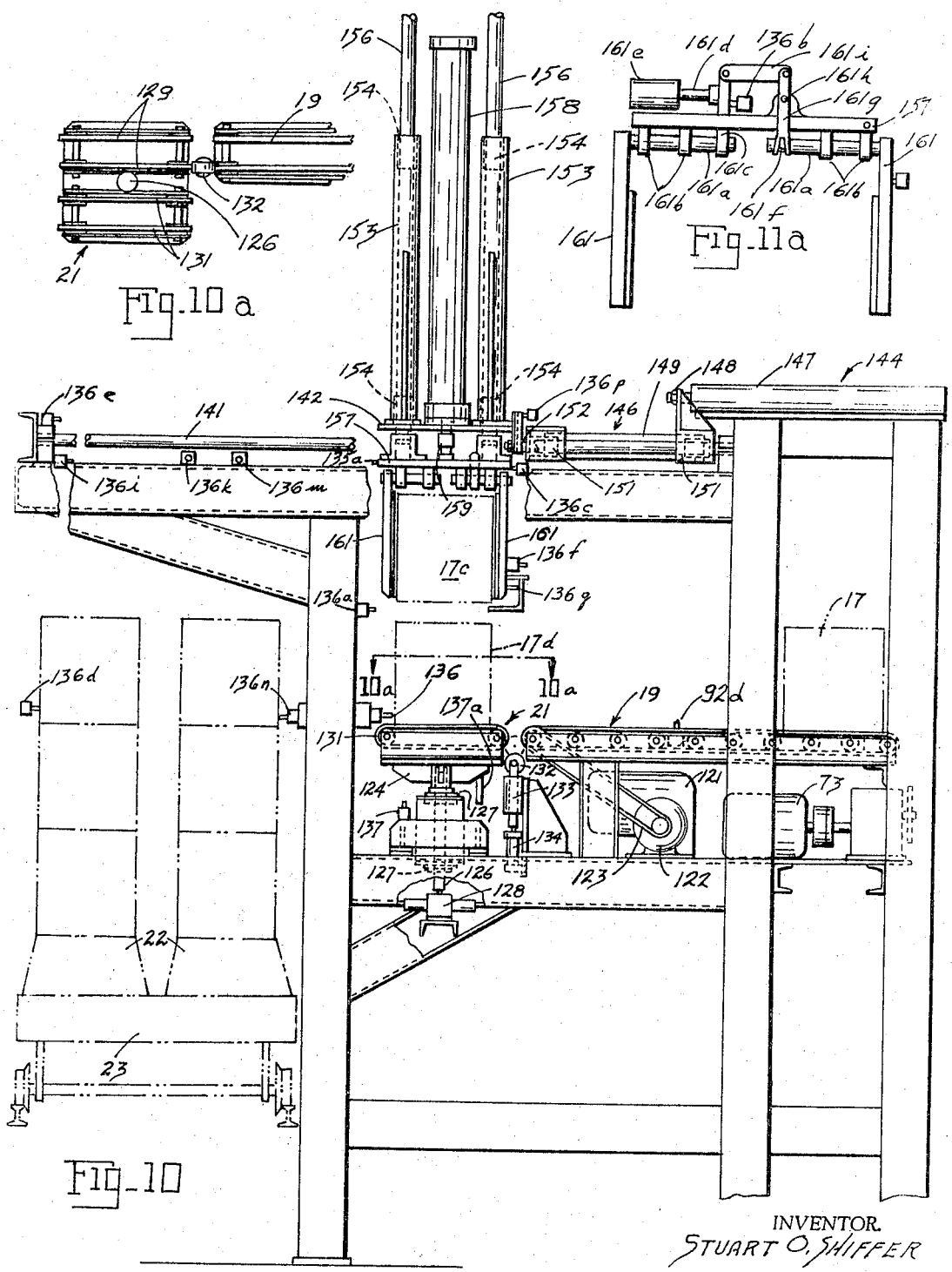

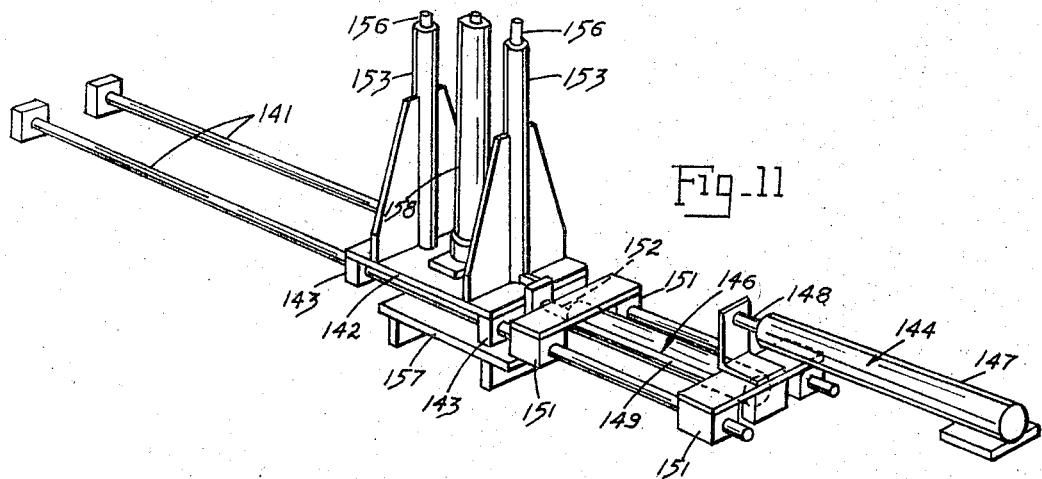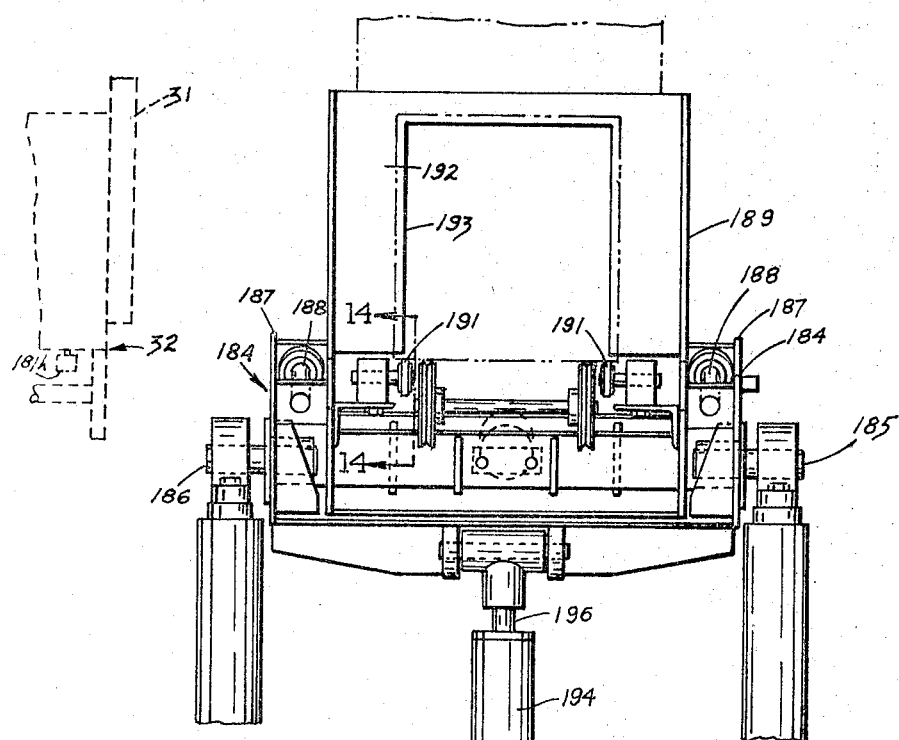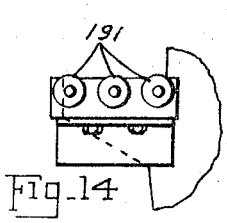

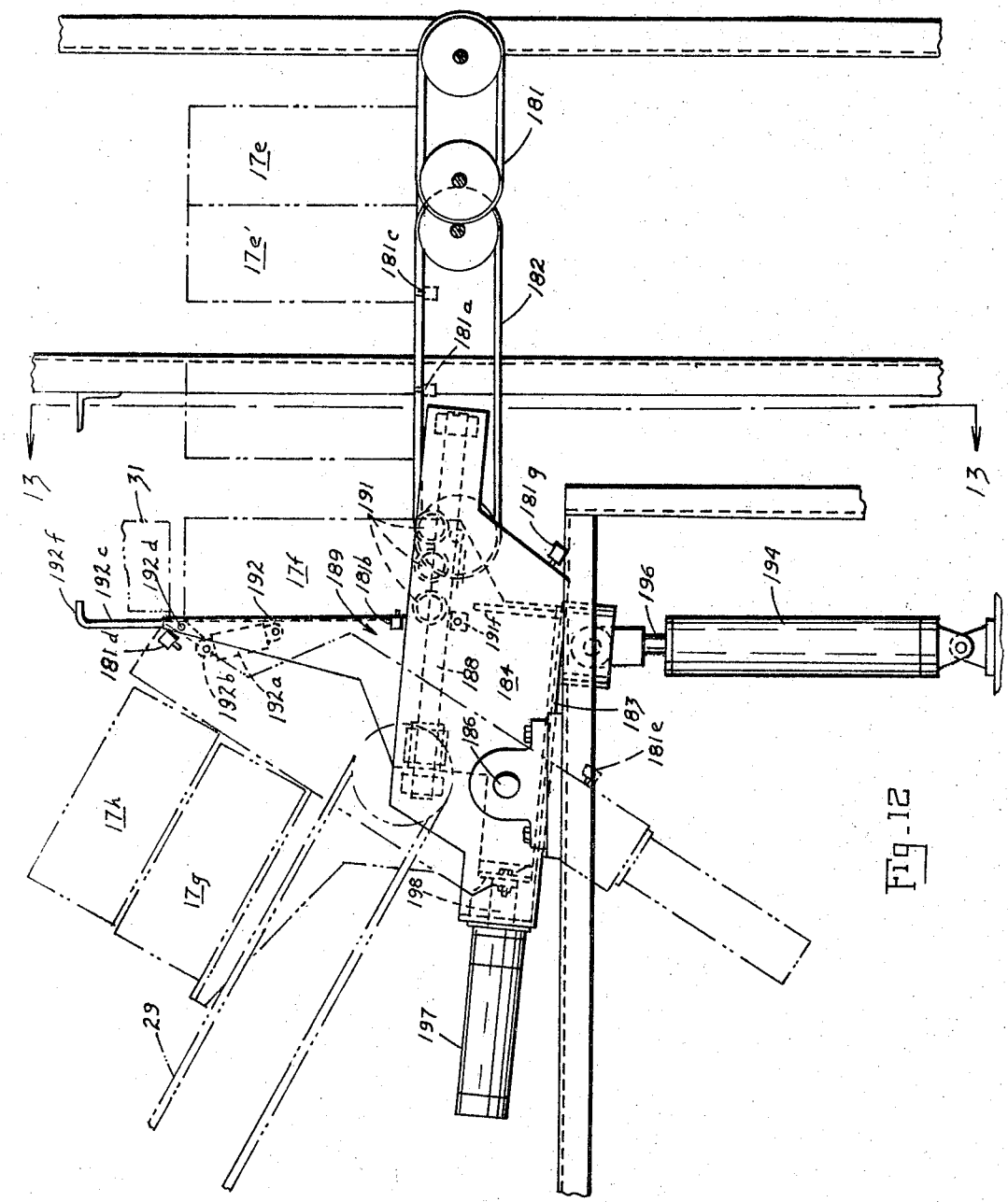

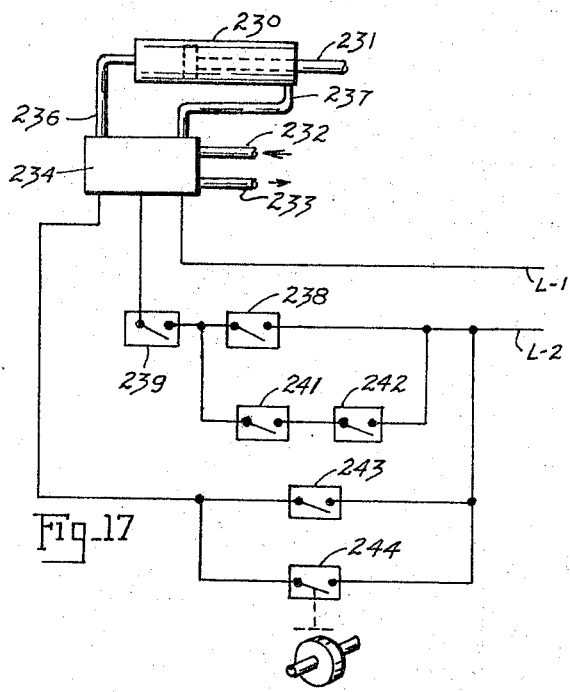
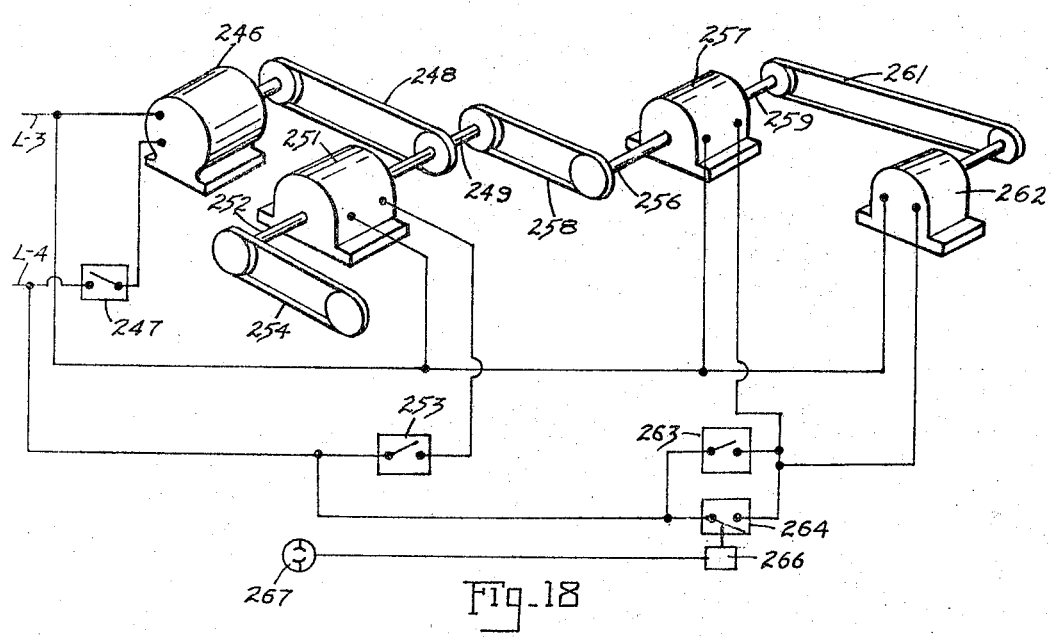

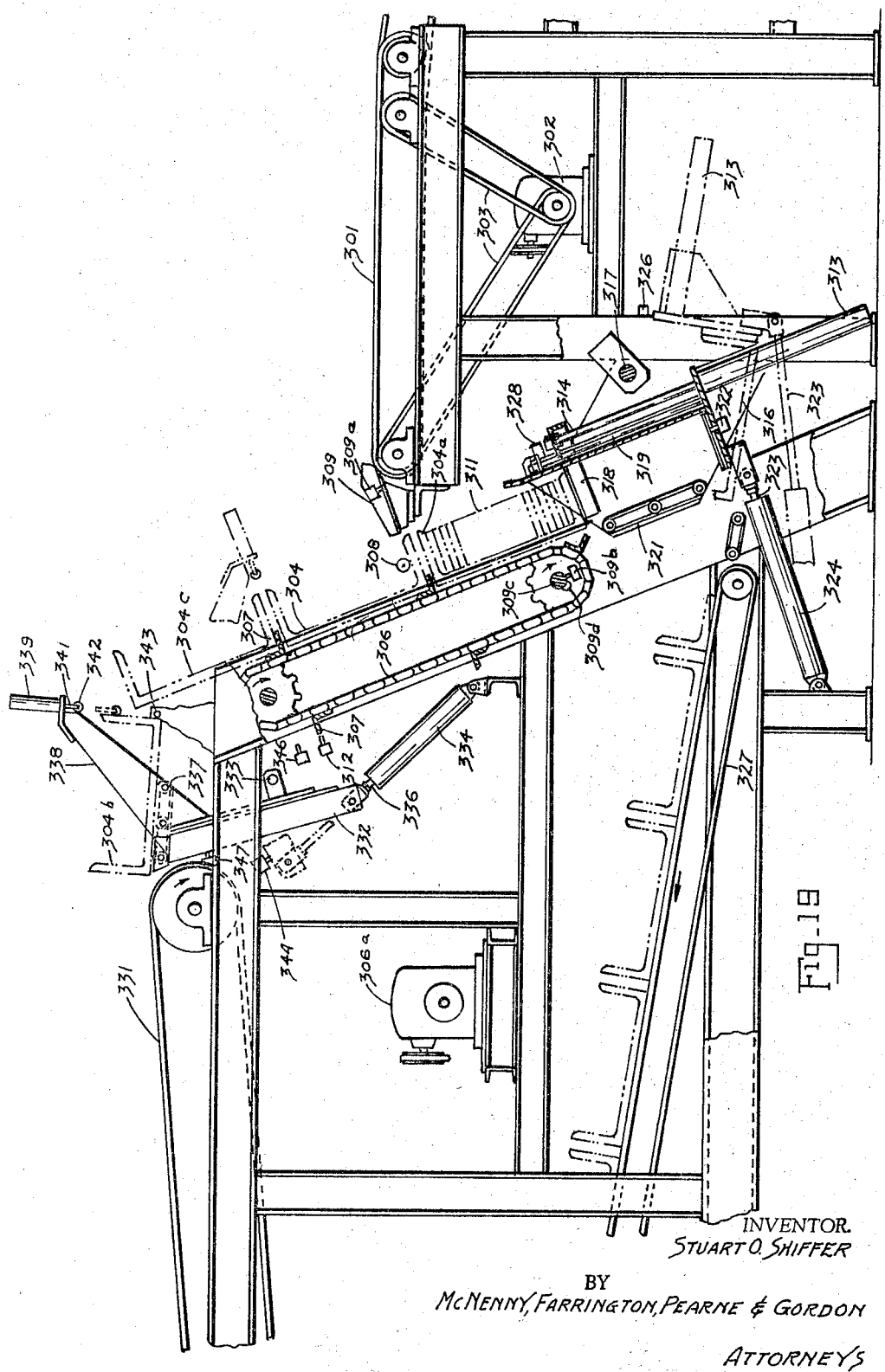

United States Patent Office 3,315,785
Patented Apr. 25, 1967

3,315,785
AUTOMATED TILE HANDLING SYSTEM
Stuart O. Shiffer, % Shiffer Industrial Equipment, Inc., 7559 Orlando Drive, Parma, Ohio 44129
Filed Oct. 14, 1964, Ser. No. 403,714
13 Claims. (Cl. 198—85)

This invention relates generally to automated systems for processing articles and more particularly to such a system for automatically transporting tiles from a forming station through the firing operation to form finished tile. The system includes means transporting tile to a loading station wherein such tiles are automatically loaded into saggers or setters for firing. The term "sagger" will be used herein to include both saggers and setters. The system also includes means to transfer the loaded saggers to cars which transport the saggers through a firing oven and thereafter to an unloading station. Further, the system includes means to unload the saggers from the cars, empty the tiles from the saggers and carry the empty saggers to the loading station.

All of the various subsystems are interconnected so that each performs its function only as required to meet the supply of tiles to be processed. This insures automatic synchronization of all of the subsystems.

Although this invention is disclosed for use in connection with the loading of saggers with tile of the general type known as wall tile or floor tile it is also satisfactory with appropriate modifications within the scope of the invention for the handling and processing of other types of articles.

It is an important object of this invention to provide an automated system for the handling and processing of ceramic articles which automatically transports such articles through the required processing steps of manufacture.

It is another important object of this invention to provide an automated system for transporting, stacking and loading of articles combining various operational subsystems connected together to function only when material to be handled is present, thereby eliminating undesirable buildups of handled pieces in various parts of the system.

It is another object of this invention to provide an automated sagger loader and conveyor combining to transport ceramic objects from a forming or treating operation to the sagger and which functions to automatically load the sagger preparatory to the firing of the articles.

It is also another object of this invention to provide a novel and improved transfer apparatus for positioning loaded saggers on oven cars or other suitable means for transport through a firing oven.

It is still another object of this invention to provide a novel and improved unloading mechanism for handling saggers after firing and positioning the individual saggers for automatic dumping.

It is also another object of this invention to provide a novel and improved automated dumping device for emptying fired articles from saggers.

It is still another object of this invention to provide an automated conveyor system for transporting empty saggers into proper position for loading with ceramic articles.

It is still another object of this invention to provide a novel and improved automated system for the transporting of tile, and the like, from the forming process through the firing processing thereof.

It is still another object of this invention to provide a combination of subsystems for the automatic handling of saggers and ceramic articles interconnected for automatic operation wherein each subsystem operates only as required to supply saggers for loading when ceramic articles are available, and for the movement of loaded saggers away from the loading operation only after loading thereof.

Further objects and advantages will appear from the following description and drawings wherein:

FIGURE 1 is a schematic plan view of a tile handling system incorporating this invention illustrating the various subsystems and their interrelationship to form the total system;

FIGURE 2 is a schematic side elevation, with parts removed for purposes of clarity, illustrating the general arrangement of the system;

FIGURE 3 is an enlarged fragmentary plan view of the diverter mechanism operable to divert tile from a single conveyor line into two parallel conveyor lines;

FIGURE 4 is a side elevation, with parts removed for purposes of illustration, showing the structure of the diverter;

FIGURE 5 is a perspective view of a sagger on which the tile are loaded for transportation through a firing oven;

FIGURE 6 is a side elevation, with parts removed, of the loading station in which tiles are loaded into the saggers;

FIGURE 6a is a fragmentary view of the cam operated switches for controlling certain phases of the loading operation;

FIGURE 7 is an enlarged fragmentary view of the apparatus for placing the empty saggers in the loading mechanism illustrating the structural detail thereof;

FIGURE 8 is a fragmentary perspective view of the elevator mechanism operable to carry the loaded saggers up away from the loading conveyor into the swinging transfer;

FIGURE 9 is a fragmentary perspective view of the swinging transfer which places the loaded saggers on the conveyor for transfer of the saggers away from the sagger loading station;

FIGURE 10 is a side elevation, with parts broken away for purposes of illustration, of the conveyor which transports the loaded saggers away from the loading station and the car loading apparatus which places the loaded saggers on the cars for movement through the firing furnace;

FIGURE 10a is a fragmentary plan view of the turntable taken along 10a—10a of FIGURE 10;

FIGURE 11 is a fragmentary perspective view of the operating mechanism for the car loading apparatus;

FIGURE 11a is an enlarged fragmentary side elevation of the gripper structure of the car loading apparatus for lifting the saggers from the turntable;

FIGURE 12 is a fragmentary side elevation of the dumping apparatus which empties the saggers after the tile has been fired;

FIGURE 13 is a fragmentary section taken along 13—13 of FIGURE 12 illustrating structural detail of the dumping apparatus;

FIGURE 14 is a fragmentary section taken along 14—14 of FIGURE 13 illustrating the roller support structure for the dumping apparatus;

FIGURE 15 is a fragmentary section of the elevator which transfers the empty saggers from the sagger conveyor to the level for positioning on the ladder;

FIGURE 16 is a fragmentary plan view illustrating the structure of the elevator and lateral conveyor;

FIGURE 17 is a schematic illustration of a representative control circuit for a piston and cylinder actuator of the type used to power certain components of the system;

FIGURE 18 is a schematic illustration of a representative drive and control circuit for operating the conveyors in the system; and, FIGURE 19 is a fragmentary side elevation of a modified form of sagger loader particularly suited for loading of unglazed tile.

In the manufacture of ceramic articles, such as tile and the like, it is customary to load the green or glazed tile in saggers and then place the loaded saggers on cars or the like for transportation to the firing furnace. After firing the saggers are removed from the cars and emptied of fired tile. Thereafter the process is repeated by again loading the saggers for subsequent firing. In the past this general processing has been customarily performed manually at considerable expense. In addition, manual loading and handling of the tile and saggers often resulted in objectionable breakage. In a system incorporating the present invention the tiles are automatically loaded into empty saggers and automatically stacked on cars for transportation through the firing oven. After firing the saggers are automatically unloaded from the cars and dumped. The entire system is arranged to eliminate all manual handling of the tile and saggers and is arranged to provide high speed operation with a substantial elimination of breakage caused in the past by non-uniform performance of each operation.

The various subsystems are interconnected so that the machine automatically functions whenever tile is present for handling and automatically operates at the rate necessary to handle the tiles being manufactured. Therefore, the system automatically eliminates the buildup in the various portions thereof and automatically compensates for various rates of manufacture.

Referring to FIGURE 1. The automated system includes a belt type conveyor 10 which carries tile from a glazer or molding machine 11. It should be understood that the machine 11 can be of any type and can perform any processing step in the manufacture of tile. It is merely illustrated schematically to show a source of tile to be handled.

A diverter 12 receives tile from the conveyor 10 and diverts the tile into two conveyor lines 13 and 14 which carry the tile to a sagger loader station 16. The diverter 12 is only used when it is desirable to load the tile from two or more conveyor lines. By forming the two lines 13 and 14 the rate of tile movement can be substantially reduced and two tiles can be loaded simultaneously in the sagger. If more than two lines are required the diverter 12 can be modified to form more than two lines or, as an alternative, subsequent diverters can be provided to breakup each of the lines 13 and 14 into two or more lines. Further modification may be desired in some instances to use the diverter system to combine a plurality of lines.

At the loader station 16 saggers 17 are positioned in alignment with the lines 13 and 14 and in the illustrated embodiment two tiles, one from each line 13 and 14, are loaded onto each shelf of the saggers 17. Indexing means are provided to position each empty shelf of the sagger in a loading position and feed means automatically feed two tiles onto each shelf. In the illustrated embodiment each of the saggers is provided with nine shelves on which two tiles are loaded so each sagger receives eighteen tiles during the loading operation.

The loaded saggers move by means of an elevator into a swinging transfer 18 which places the loaded saggers on a cross conveyor 19. This conveyor transports the loaded saggers to a turntable 21 which operates to position two loaded saggers in a side by side relationship.

A gripper transfer lifts each pair of loaded saggers from the turntable 21 and positions them on pedestals 22 provided on oven cars 23. In the illustrated embodiment three pairs of loaded saggers are positioned on each pedestal in stacks three saggers high and two aligned pedestals are loaded in each loading position of the cars 23. Also, each car is provided with eight pedestals so each car carries forty-eight loaded saggers.

The oven cars 23 are moved by conventional means through a firing oven (not shown) to an unloading position at 24. The structure and arrangement of the firing furnace forms no part of this invention except insofar as it cooperates with the system and is preferably of the type for continuous firing by passage of the tile therethrough on the oven cars 23. Also, the means for moving the oven cars is not illustrated.

At the unloading station 24 a gripper unloader 26 is provided which automatically functions to lift two saggers at a time from the oven cars 23 and place them upon a conveyor 27 which automatically spaces the individual saggers for movement into a dump station 28. A dumper is located at the dump station 28 which tips the saggers and empties the fired tile onto a conveyor 29 which carries the fired tile out of the machine for sorting, further processing, or packing as the case may be.

The empty saggers are then transported by a gripper transfer 31 to a conveyor 32 which moves the empty saggers 17 to an elevator station 33. At the elevator station 33 means are provided to lower the empty saggers down to a cross-conveyor 34 below the conveyor lines 13 and 14. This conveyor positions the saggers in a rocking transfer 36 which places the empty saggers on an indexing conveyor 37, which in turn transports the saggers up past the lines 13 as they are loaded.

The system functions to automatically handle tile from the machine 11, load the tile into saggers which are in turn automatically carried through the firing furnace. The system further automatically removes the saggers from the firing cars after the firing of the tile, dumps the fired tile onto a conveyor and returns the empty saggers to the loading station. Thus, this invention eliminates entirely the manual handling of the tile during the firing operations.

The various elements and subsystems are power operated and connected by control means so that the loader only operates when tile is present for loading. The loaded saggers are only positioned on the firing car as loaded saggers are available for such operation. The unloading of the firing cars is normally operated so that the saggers are unloaded and dumped only as required to provide empty saggers for loading. Also, the conveyors and elevators for the empty saggers only operate to supply saggers to the loader as required to meet the needs of the loader. The rate of operation of each of the subsystems is arranged to provide sufficient capacity to properly function when the machine 11 is operating at its maximum rate and the maximum number of tiles are supplied along the parallel lines 13 and 14. In instances where no tile are supplied along the parallel conveyor lines 13 and 14 each element of the machine will automatically cease to operate because there will be no filled saggers to be loaded on the oven cars and no requirement for empty saggers for loading.

Referring to FIGURES 3 and 4, the conveyor 10 includes two parallel belts 10a and 10b which cooperate to carry the tile toward the diverter 12. Aligned with the conveyor 10 are separately driven intermittently operated conveyor belts 41 forming a conveyor section running at a higher speed than the belts of the conveyor 10 so that a spacing will occur in most instances between adjacent tiles as the tiles are picked up by the conveyor belts 41. By providing the spacing it is possible to insure that a photoelectric cell 42, positioned below the conveyor belts 41, will sense the gap between adjacent tiles. This photoelectric cell is connected in the usual manner to a counting mechanism which operates the diverter 12 after a predetermined number of tiles has passed the cell 42. As an example, the counting mechanism can be adjusted to operate the diverter 12 each time five tiles pass over the conveyor belts 41. In such example five tiles are diverted to the line 13 followed by diverter operation to supply five tiles to the line 14. This sequence is continued so that the tiles are divided substantially equally between the lines 13 and 14.

The conveyor lines 13 and 14 are driven by an electric motor as will be described in detail below and are connected to supply the power for the conveyor belts 41 and the conveyor belts 10a and 10b. To provide this power the conveyor lines 13 and 14 pass over end pulleys 13a and 14a respectively which are fixed to a cross-shaft 14b. Fixed to one end of the cross-shaft 14b is a drive pulley 14c which drives a belt 14d and thereby drives a pulley 41a mounted on a cross-shaft 41b. The pulleys 41c at one end of the conveyor belt 41 are free to rotate relative to the cross-shaft 41b so that rotation of the cross-shaft 41b does not drive the conveyor belts 41. However, a drive pulley 41d is mounted on the cross-shaft 41b for rotation therewith and drives a cross-shaft 10c through a belt 10d and a pulley 10e mounted on the cross-shaft 10c.

The pulleys 10f are mounted on the cross-shaft 10c for rotation therewith and operate to drive the belts 10a and 10b. A cross-shaft 41e is driven from the cross-shaft 10c through a pulley 41f, a belt 41g and a pulley 41h. The pulley 41f is fixed for rotation with the cross-shaft 10c and is larger in diameter than the pulley 41h mounted on the shaft 41e so that the shaft 41e will rotate with a higher velocity than the shaft 10c.

A solenoid clutch 41i when operated connects the shaft 41e with an output shaft 41k on which the drive pulleys 41m for the conveyor belts 41 are mounted. A solenoid brake 41n is connected to lock the shaft 41k against rotation to stop the conveyor belts 41 when desired. The control circuit for the brake 41n and the clutch 41i is arranged so that the brake is released when the clutch is engaged and the brake is engaged when the clutch is released. Therefore, the conveyor belts 41 can be operated in an intermittent manner by proper operation of the clutch 41i and brake 41n.

The intermittent operation of the conveyor belts 41 is to provide a substantial spacing between adjacent tiles passing over the diverter 12 to permit movement of the diverter from one position to the other while there are no tiles passing. In other words, after a proper number of tiles passes over the conveyor belts 41 the conveyor belts 41 stop momentarily so that the diverter 12 can shifted to the other position and then the conveyor belts are automatically started to supply the next group of tiles. By powering all of the conveyors 10, 13, 14 and 41 from the same source proper synchronization and speed control is automatically achieved.

The diverter 12 includes a switching assembly 43 including a shaft 44 journaled in spaced bearings 46 for oscillating movement about the longitudinal axis of the shaft 44. A crank arm 47 is mounted on the shaft 44 and connected to the piston 48 of an air cylinder 49. Extension of the piston 48, as viewed in FIGURE 3, produces clockwise rotation of the switching assembly 43 and retraction of the piston produces anti-clockwise rotataion. The various elements are proportioned so that the switching assembly 43 is turned from the position illustrated in FIGURE 3 in a clockwise direction into alignment with the line 13 in one extreme of movement and is in alignment with the line 14 when in the position illustrated.

A center belt 51 and two side belts 52 and 53 are provided on the switching assembly with each of the belts passing over associated pulleys 54. A drive motor 56 is mounted on the lower end of the shaft 44 and is connected through a drive belt 57 to rotate a drive shaft 58 which extends across the assembly. A belt 58a connects the drive shaft 58 to a cross shaft 58b to power the belts 52 and 53 and a belt 58c connects the drive shaft 58 to a cross shaft 58d to drive the belt 51.

When the switching assembly 43 is in position illustrated in FIGURE 3 the drive belts 53 and 51 are aligned with conveyor belts 61 aligned with the conveyor belts 41 and also in alignment with conveyor belts 62 aligned with the conveyor line 14. Therefore, tile moving down the main conveyor 10 is diverted by the belts 51 and 53 onto the conveyor line 14 when the diverter 12 is in the position shown. When the cylinder 49 is operated to extend the piston 48 the drive belts 52 and 51 are in alignment with the belts 61 of the main conveyor and with belts 63 of the conveyor line 13. In that position the tile are diverted from the main conveyor to the conveyor line 13 .

The conveyor belts 61 are driven by pulley 61a fixed for rotation with the cross-shaft 41b and the conveyor belts 62 and 63 are driven by pulleys 62a and 63a mounted on the cross-shaft 14b. The cylinder 49 is connected to a suitable source of air pressure through a solenoid operated valve which is connected through an adjustable timer for operation by the photoelectric cell 42.

In operation when the proper number of tiles passes the photocell 42 to correspond with the counter setting the circuit is operated to engage the brake 41n and disengage the clutch 41i. This automatically stops the conveyor belts 41. The circuit is also arranged so that this starts the adjustable timer (not shown) which is set to delay the switching of the diverter 12 until sufficient time has elapsed for the tile to pass along the conveyor belts 61 over the diverter and to the selected conveyor belts 62 or 63. As soon as the timer trips, after the group of tile has passed the diverter, the solenoid valve controlling the cylinder 49 operates to shift the diverter to the subsequent position and also starts the conevyor belts 41 by engaging the clutch 41i and disengaging the brake 41n. The use of an adjustable timer permits minor adjustments in the operation of the mechanism to compensate for variations in the operation of the system. Since such electrical timing circuits and counting circuits are well known in the art they have not been shown but representative circuits will be discussed below.

The divided lines of tile are carried down the lines 13 and 14 to the loading station, illustrated in FIGURE 6, wherein the tiles are loaded onto a sagger 17 of the type illustrated in FIGURE 5. The saggers are normally ceramic formed as an open sided box having shelves 64 each of which is a size to receive two tiles in a side-by-side relationship. Each of the lines 13 and 14 supplies a single tile to each of the shelves 64 at the loading station 16 illustrated in FIGURE 6.

Empty saggers are carried into the rocking transfer 36 as described below. The rocking transfer 36 is pivoted at 66 for movement between the sagger receiving position illustrated in full line in FIGURE 6 and a forward position in which the empty sagger is placed on the indexing conveyor 37. To operate the rocking transfer 36 an air cylinder 67 is provided with a piston 68 connected to the rocking transfer 36 by a pivot 69. The indexing conveyor 37 is provided with spaced flights 71 carried by drive chains 37a which engage the underside of the saggers 17 and carry them up along the indexing conveyor.

The indexing conveyor 37 includes a pair of laterally spaced parallel drive chains 37a (only one of which appears in the drawings) each of which passes around a sprocket 37b at one end and a sprocket 37c at the other end. The sprockets 37c are mounted on a cross-shaft 37d and the sprockets 37b are mounted on a cross-shaft 37e.

Referring now to FIGURE 6a. The cross-shaft 37e is provided with four cams 37f, 37g, 37h, and 37i. Each of these cams is provided with an associated switch 37f', 37g', 37h', and 37i', respectively. The switches are arranged so that they are operated by the associated cams 37f through 37i at predetermined points in the rotation of the shaft 37e. The sprocket pulley 37b in FIGURE 6 is sized so that as it turns through one complete revolution the chains 37a move through a distance equal to the distance between each of the flights 71.

The switch 37f is connected to operate a solenoid valve to supply pressure to the cylinder 67 when a flight 71a is in the position illustrated and cause the piston 68 to rock the transfer 36 in a counterclockwise direction and carry an empty sagger 17 over to its position against the conveyor 37. The transfer remains in the forward position while the conveyor moves upward until the flight 71a engages the bottom of the sagger and lifts it off of the transfer. The switch 37g' then operates and causes the solenoid valve to reverse the pressure connections to the cylinder 67 and return the empty transfer to the full line position of FIGURE 6. In this way an empty sagger is positioned on the conveyor 37 between each flight 71 and is carried upward into alignment with conveyor lines 13 and 14 by the indexing movement of the conveyor 37.

A motor 73 is connected through a clutch and brake drive 74 and a drive belt 76 to drive the indexing conveyor 37. The clutch and brake mechanism 74 is arranged for electric operation to intermittently move the indexing conveyor 37 in an anti-clockwise direction to raise subsequent shelves 64 into alignment with the loading position and then stop the conveyor in such loading position until the shelves are loaded, after which the indexing conveyor is operated to raise the next shelf into loading position.

To control the operation of the clutch and brake mechanism 74 and in turn the operation of the conveyor 37 several switches and other sensing devices are provided. A switch 77 is mounted adjacent to the conveyor for operation by engagement with a shelf 64 when a shelf moves into loading position. This switch is connected through a timer (not shown) to operate the clutch and brake mechanism and stop the conveyor as soon as a shelf is properly positioned for loading. The timer is used in conjunction with the switch 77 to insure that the shelves do not stop in engagement with the switch which would prevent further operation and also so that adjustment is provided. A photoelectric cell 78 is mounted above a short conveyor 81 at the end of each of the conveyor lines 13 and 14 and is arranged to sense the passage of a tile over the conveyor belts 81 onto the shelves from each of the lines. Preferably, the photoelectric cells 78 are of the type having both the light source and the receiver within the cell. The cells 78 are connected so that after both cells 78 have sensed the passage of a tile from each of the lines 13 and 14 they operate the clutch and brake mechanism 74 for driving, causing a subsequent empty shelf to move up to the loading position.

A section of each of the conveyor lines 13 and 14 includes an intermittently driven conveyor section 80 immediately preceding the conveyor portions 81. A clutch and brake mechanism (not shown) is included in the drive of the conveyor section 80 which is operable electrically to connect the conveyor section to the power source and cause the conveyor section to move when required and stop the conveyor section when required. The tiles carried along each of the lines 13 and 14 pass on to the associated conveyor section 80 and as the conveyor section 80 operates are transported to the short conveyor section 81. When a tile piece passes the photoelectric cell 78 of the associated conveyor line, this clutch and brake mechanism operates to stop the conveyor section 80 to prevent a second tile from being loaded on a given shelf from the associated line.

As soon as an empty shelf is moved into position by the conveyor 37, each of the conveyor sections 80 is again started and remains in operation until a tile passes through the beam of the photoelectric cell 78 associated with that line. This way the conveyor section 80 with its intermittent drive acts as a gate to supply one tile from each line onto each of the shelves 64 as they move into the loading position and prevents additional tiles from feeding from each of the lines until an empty shelf is again presented for loading. The short conveyor section 81 operates continuously so that a piece of tile passing through the beam and sensed by the associated photocell 78 will be carried onto the shelf even though the conveyor section 80 stops.

In order to prevent loading of tile onto the top surface of the sagger, the switch 37h' operated by the cam 37h on the cross shaft 37e is connected to prevent the switch 77 from stopping the conveyor 37 as the switch 77 engages the top of the sagger. Therefore, the switch 37h' operates to prevent the switch 77 from stopping the conveyor 37 when the top of the sagger moves into the loading position and permits the switch 77 to stop the conveyor 37 only when the shelves 66 are in position for loading.

A drive motor 82 is connected through a gear box 83 and a belt 84 to power the conveyor lines 13 and 14, including the conveyor sections 80 and 81. The intermittent drive of the conveyor section 80 is accomplished by a clutch and drive mechanism of the type illustrated in FIGURE 2 at 41i and 41n. The conveyor 10 is also powered by the motor 82 by means of the connection described above including the belts 14d and 10d.

As the saggers 17 are loaded they are caused to raise up along idler rollers 87 into the position of the sagger 17a (shown in phantom). A lift mechanism 91 then engages the bottom of the sagger 17a and raises it into a swinging transfer assembly 18. The lift mechanism is illustrated in FIGURES 6 and 8 and includes a frame 92 pivoted at 93 and provided with parallel guide rods 94. A carriage 96 is mounted for vertical reciprocation on the guide rods 94 and is provided with bearings 97 to guide the carriage in its reciprocation. A cylinder 98 is mounted on the frame 92 and is provided with a piston 99 connected to the carriage 96 to produce the reciprocation thereof. The carriage 96 is formed with spaced parallel projecting arms 101 adapted to engage the underside of a sagger 17a and lift the sagger up into the swinging transfer 18. The arms 101 are spaced apart a sufficient distance to clear the flights 71 and engage the edges of the sagger 17a.

A cylinder 102 is mounted on the machine frame and provided with a piston 103 pivotally connected to the frame 92 of the lift mechanism. This cylinder controls the movement of the frame 92 about the pivot 93 from the solid line position of FIGURE 6 to the phantom line position.

In operation the cylinder 102 is operated to retract the piston 103 and swing the carriage out clear of the sagger 17a. The cylinder 98 is then operated to extend its piston 99 and carry the carriage down to the phantom line position wherein the arms 101 are immediately below the sagger 17a. The cylinder 102 is then operated to swing the arms in underneath the sagger 17a and the cylinder 98 then is operated to retract the piston 99 and raise the sagger 17a into the swinging transfer 18.

Here again, electric valves are provided to control the operation of the cylinders 102 and 98.

The switch 37i' is operated by its associated cam 37i when the sagger 17a is in the phantom position and causes the piston 103 to extend and swing the frame 92 into the full line position moving the arms 101 underneath the fully retracted the carriage 96 engages and operates a switch 92a which is connected to actuate a solenoid valve and supply pressure to retract the piston 99. This lifts the sagger from the position 17a up into the swinging transfer 18 into the position 17b. When the piston 99 is fully retracted the carriage 96 engages and operates a switch 92b which actuates the control valve for both of the cylinders 98 and 102 and causes the piston 103 to retract and the piston 99 to extend returning the carriage 96 to the phantom position where it is ready to receive the subsequent loaded sagger.

Referring to FIGURES 6 and 9, the swinging transfer includes a frame 104 pivoted on the machine frame at 106 for movement between the full line position of FIGURE 6 and the phantom line position in which it is immediately over the cross conveyor 19. An air cylinder 107 is provided with a piston 108 connected to the frame 104 and operates to swing the frame 104 back and forth between the two positions illustrated. The frame 104 is formed with an open box-like sagger receiving portion 109 provided with idler guide rollers 111 which are in alignment with the idler rollers 87 when the swinging transfer 18 is in the sagger receiving position. Opposite the idler rollers 111 the box structure 109 is provided with a side wall 112 having a plurality of guide bushings 113. A clamp plate 114 has pins 116 movable in the bushings 113 which guide the clamp plate for movement perpendicular to the side wall 112 toward and away from the idler rollers 111. An air cylinder 117 is mounted on the side wall 112 and provided with a piston 118 connected to the clamp plate and is operable to move the clamp plate back and forth toward and away from the idler rollers 111.

When the elevator mechanism 91 operates to lift a sagger from the position 17a up along the idler rollers 87 and 111 into the swinging transfer, the clamp plate 114 is moved back away from the idler rollers to provide clearance. As soon as switch 92b is operated and in effect senses that the sagger is in the position 17b within the swinging transfer 18, the cylinder 117 is pressurized to push the clamp plate 114 into engagement with the sagger and thus hold the sagger in the transfer. The cylinder 107 is then operated to swing the transfer into the phantom line position and position the sagger carried thereby over the continuously operating cross conveyor 19, as illustrated in the phantom position. This causes operation of a switch 92c which is connected to control the valve for the cylinder 117 and to retract the clamp plate 114. This permits the loaded sagger to drop down onto the conveyor 19. The far side of the box structure 109 as viewed in FIGURE 6 is open to allow the sagger to be carried along the cross conveyor 19 to the turntable 21.

Referring now to FIGURE 10. The cross conveyor 19 is driven by a motor 121 through a speed reducer 122 and a drive belt 123. A switch 92d is mounted in a position to be engaged and operated by a sagger moving along the cross conveyor 19 after the sagger has been carried out of the swinging transfer 18. This switch 92d operates to control the valve connected to the cylinder 107 and cause retraction of the piston 108, illustrated in FIGURE 6, moving the swinging transfer back to the position to receive the subsequent sagger.

The turntable 21 is aligned with the conveyor 19 and includes a base 124 mounted on a shaft 126 pivoted on spaced bearings 127 for rotary movement around the axis of the shaft 126. A rotary drive motor 128 having an output shaft which rotates through 180° is connected to the shaft 126 to oscillate the base 124 back and forth through an arc of 180° between two extreme positions.

Referring to FIGURE 10a, the turntable 21 is provided with two independent conveyors 129 and 131 which are spaced on either side of the shaft 126 and extend parallel to each other. The various elements are proportioned so that when the base 124 is in one position the conveyor 129 is aligned with the cross conveyor 19, as illustrated in FIGURE 10a. When the base is rotated to 180° from this position the conveyor 131 is aligned with the conveyor 19. An idler drive wheel 132 is mounted for vertical reciprocation in a bearing 133 between the retracted position illustrated in FIGURE 10 in full line and the extended position shown in phantom. An actuator 134 is mounted to raise and lower the idler wheel 132 between its two positions.

The idler wheel is positioned so that when it is raised it produces a friction drive between the cross conveyor 19 and the one of the conveyors 129 or 131 which is aligned with the conveyor 19. Therefore, one of the conveyors 129 or 131 is driven with the cross conveyor 19 by the idler drive 132 and a sagger carried by the cross conveyor 19 is carried forward until it is positioned on one or the other of the conveyors 129 or 131. The switch 92d is connected to operate the valve for the actuator 134 and cause its extension as a sagger passes along the conveyor 19 toward the turntable.

A switch 136 is engaged by the sagger 17 when the sagger is in position illustrated in phantom at 17d on the conveyor 129. This switch 136 is connected to operate the actuator 134 and retract the roller 132 thereby removing the drive between the cross conveyor 19 and the short conveyor 129. The switch 136 is also connected to operate the actuator 128 and cause the turntable 21 to rotate through 180° until the short conveyor 131 is aligned with the cross conveyor 19. During this movement the sagger supported by the conveyor 129 is carried laterally to a position parallel to but spaced to one side of the conveyor 19. A switch 137 mounted on the base of the turntable is engaged by a pin 137a mounted on the base 124 when the indexing table has completed its rotation through 180° bringing the conveyor 131 into alignment with the cross conveyor 19.

When the subsequent sagger engages the switch 92d the actuator 134 is again extended. This time causing the roller 132 to provide a driving connection between the cross conveyor 19 and the short conveyor 131. When a sagger is properly positioned on the conveyor 131, the switch 136 is again operated and the actuator 134 is operated to again retract the roller 132 removing the driving connection to the conveyor 131. The switch 136 is also connected in series with the switch 137 and when both of the switches are operated there is an indication that there are two saggers positioned in a side-by-side relationship on the turntable ready for transfer to the oven cars by the car loading mechanism.

In order to transfer each pair of loaded saggers 17 from the turntable 21 to the oven car, a gripper transfer mechanism, best illustrated in FIGURES 10, 11a and 11, is utilized. This mechanism includes a pair of parallel fixed rods 141 which guide a carriage 142 in its horizontal reciprocation. Bearings to support the carriage 142 on the rods 141 are preferably of the ball bushing type. In order to reciprocate the carriage back and forth two air actuators 144 and 146 are provided. The actuator 144 includes a cylinder 147 mounted at one end on the machine frame and a piston 148 connected to a cylinder 149 of the actuator 146. The cylinder 149 is supported in spaced bearings 151 for axial movement along the rods 141. Thus, as the piston 148 extends, the cylinder 149 is pushed out along the rods 141 and when the piston 148 is retracted the cylinder 149 moves back to the position illustrated.

The actuator 146 includes a piston 152 which is in turn connected to the carriage 142. Consequently when the piston 148 extends while the piston 152 remains retracted, the carriage 142 will be carried out a distance equal to the stroke of the piston 148. However, when further extension is required, both of the pistons 152 and 148 are extended and the carriage is moved to a maximum extended position of its travel.

Mounted on the carriage 142 is a pair of similar guide tubes 153 each provided with spaced bearings 154. A rod 156 extends through each of the guide tubes and is vertically guided by the associated bearings 154. Mounted at the lower end of the rods 156 is a gripper platform 157 which is vertically movable with the rods 156 relative to the carriage 142. A cylinder 158 is mounted on the carriage 142 and provided with a piston 159 connected to the gripper platform 157. Extension of the piston 159 causes the gripper platform to be lowered with respect to the carriage 142 and retraction of the piston causes the platform to be raised.

Two pairs of gripper plates 161 are mounted on the gripper platform 157, as illustrated in FIGURES 10 and 11a. These plates are positioned so that each pair of plates is adapted to grip the sides of one of the loaded saggers 17 on the turntable 21 so that the saggers may be carried over to the oven cars 23. Two pairs of grippers 161 are provided so that any variation in the width between saggers will not produce gripping of one sagger without gripping of the other.

Referring to FIGURE 11b, each of the grippers 161 is mounted for lateral movement by rods 161a which extends through guides 161b mounted on the gripper platform 157. As viewed in FIGURE 11b the left rod 161a supporting the left gripper 161 is provided with a vertically extending arm 161c connected to the piston 161d of a cylinder actuator 161e mounted on the gripper platform 157. Extension of the piston 161d therefore causes the left gripper 161 to move to the right and retraction causes movement of the gripper to the left.

The right guide rod 161a supporting the right-hand gripper 161 is provided with a clevis pin 161f engaged by a rocker arm 161g pivoted at 161h on the gripper platform 157. The upper end of the rocker arm 161g is connected through a link 161i to the arm 161c. Therefore, retraction of the piston 161d causes movement of the right-hand gripper 161 to the right and extension of the piston causes clamping or leftward movement of this gripper.

With this simple mechanism a single actuator operates to move both of the grippers of each pair of grippers toward or away from each other. A similar actuator and connecting linkage is provided for each pair of grippers and since there are two pairs of grippers 161, there are necessarily two actuators 161e and two connecting linkages.

Referring again to FIGURE 10, when both of the switches 136 and 137 are operated indicating that there are two loaded saggers on the turntable ready for loading on the oven car, a valve (not shown) is operated to cause extension of the piston 159 to lower the grippers into position for picking up the saggers. During this movement each of the pairs of grippers is in the retracted position so that the gripers clear the saggers. When a switch 136a is engaged by a projection 135a on the gripper platform 157, the switch 136a is operated. This switch 136a is connected to the valve controlling the supply of pressure to the cylinder 158 and also to the valves controlling the pressure supplied to the clamping actuators 161e. Operation of the switch 136a closes the valve supplying pressure to the cylinder 158 and stops the downward movement of the clamps and operates the valve for the gripper cylinders 161e causing the pistons 161d to extend and move the grippers 161 into clamping engagement with the saggers at the position 17d.

A switch 136b (illustrated in FIGURE 11a) is mounted on the gripper platform 157 for engagement by the element 161c when the piston 161d extends and the saggers are gripped. This switch 136b is connected to the control valve for the cylinder 158 in such a way that it operates the valve to retract the piston 159 thereby lifting the loaded saggers up to the position 17c in FIGURE 10.

The switch 136b also operates the actuator 128 to return the turntable to its initial position with the conveyor 129 in alignment with the cross conveyor 19.

Referring now to FIGURE 10, a switch 136c is engaged by the gripper platform 157 when the piston 159 is retracted and is connected to the control valves (not shown) which operate the cylinders 146 and 147. This switch is the type which is not operated by engagement with a gripping platform 157 excepting when the gripping platform approaches the position vertically after picking up the loaded saggers. Such switches may be of the type having a one-way dog or operator and are well known in the art.

As illustrated in FIGURE 10 each of the oven cars 23 has pedestals arranged in a left and a right position and the apparatus is arranged to stack loaded saggers three high on each of the pedestals. A switch 136d is mounted for operation only when there is a full stack of saggers on the left pedestal 22. When this switch 136d is open, operation of the switch 136c causes extension of both of the actuators 144 and 146 and moves the carriage 142 to its full extended position directly over the left pedestal 22. When the extension of the two cylinders 146 and 147 is completed, a switch 136e is operated which is connected to cause extension of the piston 159 to lower the gripping platform 157 and thereby lower the loaded saggers into position.

A switch 136f mounted on one of the grippers 161 is provided with an operator 136g which engages the pedestal 22 or the previously positioned saggers when the grippers are lowered toward the pedestals. If there are no loaded saggers already positioned on the pedestals, the piston 159 extends down until the operator 136g engages the pedestal. This stops extension of the piston 159 with the loaded saggers positioned immediately above the pedestal. If, one the other hand, loaded saggers are already positioned on the pedestal, the operator 136g engages the top of the previously positioned saggers and again stops extension of the piston 159, and in such case the loaded saggers carried by the grippers 161 are positioned immediately above the previously positioned saggers on the oven car 23.

The switch 136f is connected to cause retraction of the piston 161d, illustrated in FIGURE 11a, to release the grippers 161 and thus positioned the loaded saggers on the pedestal or the previously positioned saggers, as the case may be. The switch 136f also causes the piston 159 to retract to its uppermost position so that it may move back to pick up additional loaded saggers. The lateral movement of the gripper 161 during unclamping moves the operator 136 laterally clear of the saggers so that it does not interfere with the upward movement.

When the piston 159 is fully retracted a switch 136i is operated by engagement with the gripper platform 157 and this switch 136i is connected to cause retraction of the pistons 152 and 148 which causes movement of the carriage 142 back to the position illustrated in FIGURE 10. Movement to this position operates a switch 136p which is connected to prevent lowering of the clamping platform by the action of the switches 136 and 137 unless the clamping assembly is in its required position.

The process is repeated until there are three pairs of loaded saggers stacked on the left pedestal 22, at which time the switch 136d is operated to indicate that the left pedestal is fully loaded. When this occurs only the piston 148 extends and the piston 152 remains retracted when the switch 136c is operated. Therefore, the carriage is only move to the position over the right pedestal 22 at such time. A switch 136k is brought into the circuit by the switch 136d during this portion of the operation and operates to produce the extension of the piston 159 to lower the loaded saggers onto the right pedestal during this phase of the operation. Also, a switch 136m is mounted for operation when the empty grippers are raised back to the upper position after loading saggers onto the stack on the right pedestal 22. It should be understood that each of the switches 136i, 136k, and 136m, is of the type which is operated only by movement of the operator toward the switch in the required direction and that one-way dogs are provided to prevent the operation of the switches when the operators approach the switches from directions not requiring operation. Also, the location of the switches must be arranged so that they will not interfere with the movement of the various elements. For purposes of illustration each of the switches is shown in the plane of FIGURE 10 with the understanding that it may be necessary to mount the switches in other locations to provide such clearance for movement of the various elements of the system.

A switch 136n is mounted to sense the presence of the complete stack of loaded saggers on the right-hand pedestal 22 and is connected to an operator (not shown) which pulls the oven cars forward to position the following pedestals for loading. After each oven car is loaded, it is moved by conventional means through the firing furnace and on along the tracks until it reaches the unloading station 24.

At the unloading station 24 the gripper unloader 26, illustrated in FIGURE 2, is provided, which is of the same structure as the loading gripper illustrated in FIGURES 10, 11 and 11a. It operates, however, in the opposite manner to unload the cars rather than load them. Since the structure and principal function of the gripper unloader 26 is identical with the gripper loader, it is not illustrated or described in detail.

Referring now to FIGURE 12. The pairs of saggers containing fired tiles are placed upon adjacent conveyors 181 and 182 in the manner illustrated in FIGURE 12 with one sagger in the position 17e' and the adjacent sagger in the position 17e. In order to provide a spacing between these adjacent saggers the conveyor 182 is started by a switch 181c before the conveyor 181 to move the sagger in the position 17e' to the left away from the sagger in the position 17e a predetermined distance. Here-again, a motor operating through a clutch and brake drive is connected to operate each of the conveyors 182 and 181. When the proper spacing is provided a switch 181a is operated. This switch 181a starts the conveyor 181 to transfer the sagger from the position of 17e onto the conveyor 182 toward the dump station. Both of the conveyors operate intermittently so that the dump mechanism described below is only supplied with one loaded sagger at a time. The switch 181c is operated by the presence of saggers at the position 17e' and is connected to prevent additional saggers from being unloaded from the oven car until the position is clear.

A switch 181b is mounted on the dump mechanism 183 and is connected to stop both of the conveyors 181 and 182 when the sagger is in position 17f.

The conveyor 182 operates to carry a loaded sagger into a dump mechanism 183 and then stops until that sagger is unloaded and transferred out of the dump station. The dump mechanism 183 includes a frame 184 pivoted at 186 on the main machine frame. The frame 184 includes two side plates 187 spaced apart a distance greater than the width of a sagger. Mounted on each of the side plates is a fixed guide rod 188. A sagger carrier 189 is mounted for reciprocating movement along the guide rods 188. This carrier is provided with idler rollers 191 positioned to engage the lower portion of the sagger as it is carried into the dump station by the conveyor 182. The sagger carrier is also provided with a face plate 192 proportioned to engage the side edges and top edge of the sagger but provided with an opening 193 aligned with the shelves of the sagger through which the tiles are free to pass.

When the switch 181b is operated by the presence of a sagger in the position 17f, a cylinder 192a is pressurized causing its piston 192b to extend. This causes a lock arm 192c pivoted at 192d to rotate in a clockwise direction as viewed in FIGURE 12 through 90°. The end of the lock arm 192c is formed with a lateral projection 192f which fits over the face of the sagger in the position 17f and holds the sagger at its top against the face plate 192.

A first actuator having a cylinder 194 is provided with a piston 196 connected to the frame 184 and is adapted to rock the frame 184 between the solid line position of FIGURE 12 and the phantom line position. Similarly, a second actuator having a cylinder 197 mounted on the frame 184 is provided with a piston 198 connected to the sagger carrier 189 to reciprocate the carrier back and forth along the guide rods 188. Both of the pistons 196 and 198 are retracted when the loaded sagger moves into the position illustrated at 17f. A switch 181d is mounted for engagement by the locking arm 192c when it is in the locking position and this switch is connected to actuate the cylinder 194 and cause extension of the piston 196 which rotates the frame 184 around its pivot to the dotted line position. This carries the sagger carrier 189 and the sagger into the position 17g, at which the sagger is positioned above the conveyor belt 29. The tiles drop by gravity through the opening 193 onto the belt 29; however, since the spacing is relatively short, damage to the tile does not occur.

When the carrier 189 reaches the dotted line position, a switch 181e is operated. This switch initiates extension of the piston 198 to raise the sagger carrier and sagger to the position 17h so that the sagger is clear of the tile which are carried out of the machine along the conveyor 29. As soon as the piston 198 is fully extended, a switch 191f is operated and this switch is connected to retract both of the pistons 198 and 196 returning the dump mechanism to its initial position. Such movement causes the operation of a switch 181g which, in turn, causes the retraction of the piston 192b lifting the lock arm 192c to its position illustrated clear of the sagger and initiates the operation of the third gripper transfer 31 illustrated in FIGURE 2.

A third gripper transfer 31 of a structure substantially similar to the gripper loader and gripper unloader 26 is provided to pick up the empty sagger at the position 17f and place it on the conveyor 32. In this case a simplified structure is used since the distance the gripper transfer moves the sagger is constant in each instance, since only one sagger is transferred at a time, and the level of the two conveyors 182 and 32 are the same. Here again, the structural detail of the gripper transfer 31 is not disclosed in detail with the understanding that it is substantially the same as the illustrated gripper loader with above simplifications.

Suitaby located switches are provided to control the operation of the gripper transfer with a switch 181h (shown in FIGURE 13) in position to prevent its operation until the preceding sagger is carried away by the conveyor 32.

The conveyor 32 is driven by a suitable motor drive 32a including a clutch and brake mechanism so that it is operable to move empty saggers along to the elevator station 33 illustrated in FIGURES 15 and 16.

The elevator station 33 includes a pair of parallel fixed guide rods 201 which guide an elevator carriage 202 by means of bearings 203 which slide along the guide rods 201. A cylinder 204 mounted on the machine frame is provided with a piston 206 connected to the carriage 202 to raise and lower the carriage between the upper full line position and the lower phantom line position of FIGURE 15. Mounted on the carriage 202 are idler rollers 207 which are aligned with a conveyor 32 when the carriage is in the upper position illustrated and onto which the empty sagger moves under the influence of the drive of the conveyor 32. A stop 208 provided with a switch 208a engages the back of the sagger when it is properly positioned on the elevator carriage. The switch 208a is connected to stop the conveyor 32 and to produce extension of the piston 206 which moves the carriage 202 and sagger thereon down to the phantom line position in which the sagger engages one portion of the lower cross conveyor 34. The stroke of the piston 206 is such that the carriage is carried down slightly below the level of the cross conveyor 34 so that the sagger is picked up by a pair of power driven belts 209. The cross conveyor 34 is formed with three pairs of longitudinally spaced belts all of which are driven by a motor 211 through a clutch and brake drive 212. One pair of belts 209 has a longitudinal length less than the spacing between the idler rollers 207 and is spaced from the belts 213 by a distance greater than the width of the support for one pair of the idler rollers 207. Therefore, the side plate 214 is free to pass through the plane of the cross conveyor 34. However, the gap is sufficiently short so that the sagger moves smoothly along the conveyor 34 bridging the gap between the belts 209 and 213. Similar gap is provided between the belts 213 and belts 216 to permit the side wall of the rocking transfer 36 to pass through the plane of the conveyor to receive the empty sagger.

A switch 34a is engaged by the carriage 202 when it reaches its lowered position and operates the clutch and brake 212 to start the conveyor 34 only if a switch 224 does not already engage the preceding sagger. When the sagger engages a switch 34b it causes the operation of the piston 206 to raise the carriage 202 back to its upper position. When the carriage 202 reaches its upper position its operates a switch 32b which starts the conveyor 32 to bring another sagger into the elevator.

Referring to FIGURE 7. The rocking transfer 36 includes spaced side plates 214 and 216 which are pivoted at 66 on the machine frame. A flange member 217 is mounted on each of the side plates to engage the side edges of the bottom of the sagger and a backstop 218 is positioned to engage the face of the sagger as it is carried into the indexing conveyor. A fixed stop 219 on the machine frame engages the end of the sagger when it is properly positioned in the swinging transfer 36. The gap between the belts 213 and 216 is provided to receive the side wall 214 when the rocking transfer 36 moves to the pickup position illustrated in FIGURE 7 and the rearward end of the transfer is open to clear the belts 216 and their supporting structure. Adjacent shafts 221 and 222 supporting the pulleys for the belts 213 and 216, respectively, are connected by a drive belt 223 behind the side plate 214 so that the belts 213 and 216 are both driven together by the motor 211. Similarly, a drive belt (not shown) connects adjacent ends of the belts 209 to the belts 213 across the gap for the side plates 214 of the elevator carriage 202.

The switch 224 mounted on the fixed stop 219 operates to stop the cross conveyor 34 when a sagger is positioned in the rocking transfer 36. When the rocking transfer 36 tips forward to carry the sagger onto the indexing conveyor 16, the flange members 217, in cooperation with the backstop 218, carry the sagger, lifting it away from the belts 216. This operation of the rocking transfer 36 places the empty sagger on the conveyor 37, illustrated in FIGURE 6, for loading, thus completing the cycle of operation.

Reference should now be made to FIGURES 17 and 18 which are schematic illustrations of representative control circuits used in the system. It should be understood, however, that these circuits are merely presented to illustrate the types of circuits and control elements which can be used within the system to control the various power elements and are not intended to be circuit diagrams of any given control circuit provided in the system since the particular control circuit connections required for each of the power elements is clearly within the capability of a person skilled in the art and would produce confusion of the understanding of my invention rather than clarification if the entire circuit diagram were included herein.

Referring to FIGURE 17. A pneumatic cylinder 230 is schematically illustrated having a piston 231. The cylinder is double-acting and is connected to a source of pressure 232 and an exhaust 233 through a solenoid operated four-way control valve 234. One of the controlled lines 236 extends from the control valve 234 to one end of the cylinder 230 and the other controlled line 237 extends from the control valve 234 to the other end of the cylinder 230. Control voltage is applied to the lines L–1 and L–2 with the line L–1 connected directly to the solenoid valve 234. The line L–2 is connected through a normally open sensing switch 238 in series with a normally open sensing switch 239 to the control valve 234 and is arranged so that when both the switches 238 and 239 are closed, the solenoid valve 234 moves from its normally closed position to connect the supply line 232 to one of the control lines 236 or 237 while connecting the other controlled line to the exhaust 233. This produces movement of the piston in one direction so long as both of the switches remain closed.

If desired, additional sensing switches 241 and 242 may be connected in series with both of these switches in parallel with the switch 238 to modify the operation of the valve based upon further sensing operations.

The line L–2 is connected through a sensing switch 243 to the other connection of the solenoid valve 234 so that opposite movement of the piston 231 can be produced. Hereagain, if desired, a cam operated switch 244 may be connected in parallel with the switch 243. Such a cam operated switch is illustrated in FIGURE 6a in the above discussion of my invention. Normally, the solenoid operated valve 234 would be of the type which is normally closed in the center position and is operable to one of two operated positions to produce the desired movement of the piston 231.

Reference should now be made to FIGURE 18 which discloses a representative control circuit for the conveyor drives. In this representative circuit an electric motor 246 is connected to power lines L–3 and L–4. A power switch 247 is operable to start the motor and would normally be located on the master control panel of the system. The motor 246 is connected through a belt drive 248 to a cross shaft 249. One end of the cross shaft is connected to a clutch and brake 251 which is electrically controlled to connect an output shaft 252 to the cross shaft 249 or disconnect the output shaft and lock it against rotation as required. A sensing switch 253 is operable to complete the circuit to the clutch and brake mechanism 251 and is arranged to engage the clutch and release the brake for driving the output shaft 252 when the sensing switch 253 is closed and cause the brake to engage and the clutch to disengage when the switch is open.

The output shaft is connected to any given conveyor by a belt 254 and the operation of such conveyor is controlled by the clutch and brake 251.

The cross shaft 249 can also be connected to the input shaft 256 of an electrically operated clutch 257 by a belt 258. The output shaft 259 of the electrically operated clutch 257 can be connected to a conveyor 261. In this instance a separate electrically operated brake 262 is also connected to the conveyor 261 with the clutch 257 and the brake 262 both connected to a sensing switch 263 which when closed supplies control voltage to both the clutch 257 and the brake 263. In such instance the clutch 257 is a normally disengaged clutch which is engagable by control voltage and the brake 262 is normally releasable by controlled voltage. In such a circuit a photoelectric cell operated switch 264 may be connected in parallel with the sensing switch 263 and connected to an amplifier 266 controlled by a photoelectric cell 267 of the type illustrated in FIGURE 6 at 78.

By properly arranging the various control sensing switches and clutch and brake operators in a manner well known in the art, the operation of all of the elements of the system may be interlocked as discussed above in connection with the detailed description of each of the functioning sub-systems of the total system.

FIGURE 19 discloses a second embodiment of a sagger loader sub-system. This type of sagger loader may be used with unglazed tile since the tile is stacked in the sagger without intermediate separating shelves. In this embodiment the unglazed tile is carried into the sagger loader by a conveyor 301 which is intermittently driven by a clutch and brake mechanism 302 through belts 303. The empty saggers 304 are carried down along an intermittently driven loading conveyor 306 and rest against flights 307. The power for driving the conveyor 306 is supplied by a clutch and brake drive 306a connected by a chain drive (not shown). A photoelectric cell 308 is positioned to sense across the saggers 304 in a position wherein the photoelectric cell senses the presence of a tile piece on the sagger in alignment with a loading chute 309.

The photoelectric cell 308 is connected to the drive 306a for the indexing conveyor 306 so that each time a tile is in the loading position the conveyor 306 is started. As soon as the tile on the sagger 304 moves out of the beam of the photoelectric cell 308, the sagger 304, is in position to receive an additional piece of tile so the indexing conveyor 306 is stopped.

The speed of the gating conveyor 301 is such that it operates continuously while tile is loaded on the saggers 304. In practice the indexing conveyor 306 is actuated as the tile passes onto the sagger and completes its indexing movement by the time the next tile moves into the sagger along the chute 309.

In order to prevent tile from feeding into the saggers after they are full or between the loaded and unloaded sagger a pair of switches 309a and 309b are provided. The switch 309a is located to engage tile passing along the chute 309 and the switch 309b is located adjacent to the lower shaft 309c of the indexing conveyor 306 and is engaged by a cam 309d as the shaft rotates. Here again, the size of the sprockets is arranged so that the sprocket wheels of the indexing conveyor 306 rotate through one full revolution when the chains carry the flights through a distance equal to the spacing between adjacent flights. The cam 309d is located so that it closes the switch 309b when the upper end of a sagger is approaching the loading position. The switch 309b is connected in series with the switch 309a in the control circuit of the clutch and brake drive 302. When the switch 309b closes operation of the switch 309a on the next tile causes the clutch and brake drive 302 to stop and prevent passage of tile until the bottom end of the subsequent empty sagger is properly positioned to receive tile. The switch 309b is then allowed to open by the cam 309d and the loading operation of the next sagger is repeated. The switch 309b also is connected to the clutch and brake drive 306a to prevent its being stopped by the photocell 308 during this period.

An alternate system which can be used employs the switch 309a to operate a counter which in turn shuts off the conveyor 301 after feeding a predetermined number of tile and also operates the indexing conveyor to position an empty sagger for loading.

A cylinder 313 is mounted on a swinging transfer 316 pivoted at 317 on the frame of the machine and its piston 314 is connected to an elevator 318 movable along guide rods 319 between an extended position illustrated in full line and a retracted position. Thus, when a loaded sagger 304a is properly filled, the piston 314 retracts lowering the elevator 318 and allowing the sagger to move down along idler belts 321 into the transfer.

As soon as the sagger is properly located in the transfer and supported by the idler belt 321, a sensing switch 322 is operated. This switch is connected to cause the extension of a piston 323 of a cylinder 324 mounted so the extension of the piston swings the transfer 316 in an anti-clockwise direction around its pivot 317 to the dotted line position. When this movement is completed a sensing switch 326 is operated which is connected to cause extension of the piston 314 which moves the loaded sagger up onto a conveyor 327 which carries the loaded sagger out of the machine for loading onto an oven car in the usual manner. As soon as the piston 314 is fully extended, a sensing switch 328 is operated and this switch is connected to retract the piston 323, moving the transfer back to the illustrated position so that it may receive the subsequent loaded sagger.

Empty saggers are supplied to the loader by an intermittently operated conveyor 331 aligned with a second swinging transfer 332. This transfer is mounted for pivotal movement around a pivot 333 and is powered by a cylinder 334 having a piston 336. Extension of the piston 336 rotates the swinging transfer 332 to the dotted line position and retraction of the piston moves the transfer to the full line position. Mounted on the upper end of the swinging transfer are idler belts 337 positioned to receive an empty sagger carried along the conveyor 331 and to support the empty sagger at 304b.

An extension 338 on the swinging transfer 332 provides a support for a cylinder 339 having a piston 341 with a roller 342 mounted on the end thereof. When the piston 341 is extended the roller 342 is in the dotted line position and located to engage the right-hand end of an empty sagger 304b and cooperates with the idler belts 337 to support the empty sagger in the transfer. A switch 343 mounted on the frame of the machine is operated by the sagger in the position 304b and is connected with the switch 312 to cause extension of the piston 336 to swing the transfer to the dotted line position in which a sagger is located at 304c. The switch 343 also operates to stop the conveyor 331. Upon reaching the phantom line position a switch 344 is operated. This switch is connected to retract the piston 341 allowing the empty sagger to rest against the appropriate flight 307. Operation of the conveyor 306 carries the empty sagger down for loading with tile in the manner previously described. When a flight 307 engages a sensing switch 346, the empty sagger has moved sufficiently far down along the conveyor 306 to be supported thereby. The sensing switch 346 is connected to cause the retraction of the piston 336 returning the swinging transfer to the full line position so that it can receive a subsequent empty sagger from the conveyor 331. A sensing switch 347 is operated by movement of the swinging transfer back to the sagger receiving position and is connected to initiate movement of the conveyor 331 to supply the subsequent empty saggers to the swinging transfer.

With my invention it is possible to eliminate substantially all of the manual handling of articles such as ceramic tile since the tile may be automatically loaded onto saggers and the loaded saggers thereafter automatically located onto firing cars which carry the tile through the conventional firing ovens. The system also provides for automatic unloading of the cars and dumping of the saggers. The system provides complete automated handling of the tile from the last forming step through the firing. However, it should be understood that if desired various subsystems can be used separately to eliminate the manual functions performed by such sub-system.

Although preferred embodiments of this invention are illustrated, it is to be understood that various modifications and rearrangements of parts may be resorted to without departing from the scope of the invention as defined in the following claims.

I claim:

1. A system for handling similar articles comprising a conveyor operable to transport articles to a loading station, indexing means at said loading station operable to position saggers each adapted to receive a plurality of articles in alignment with said conveyor, said indexing means operating to progressively move said sagger to indexed positions in each of which said sagger is adapted to receive an article, said conveyor including intermittently operating feed means timed with the operation of said indexing means feeding articles into said sagger in each of said indexing positions, carrier means operable to place loaded saggers on a conveyance, said conveyance being adapted to carry said saggers through a firing oven and then deliver them to an unloading station, an unloader operable to remove saggers from said conveyance and move them to a dump station, dump means operable to empty said saggers, and a sagger transport means operable to transport empty saggers from said dump station to said indexing means.

2. A system for handling tiles comprising a conveyor operable to transport tiles to a loading station and including a diverter operable to form a plurality of lines of tiles, indexing means at said loading station operable to position saggers adapted to receive tiles in alignment with said lines, indexing means operable to progressively move said sagger through a plurality of indexed positions in each of which said sagger receives tile, and feed means at said loading station timed with the operation of said indexing means feeding tile into said sagger in each indexed position, said feed means including a continuously operating delivery conveyor immediately adjacent said loading station, and an intermittently operated gating conveyor operable to supply tiles to said delivery conveyor, said gating conveyor being stationary to prevent delivery of tile to said delivery conveyor except when said sagger is in position to receive tile and then operating to deliver tile to said delivery conveyor and in turn to said sagger.

3. A system for handling tiles comprising a conveyor operable to transport tiles to a loading station and including a diverter operable to form a plurality of lines of tiles, indexing means at said loading station operable to position saggers adapted to receive tiles in alignment with said lines, indexing means operable to progressively move said sagger through a plurality of indexed positions in each of which said sagger receives tile, feed means at said loading station timed with the operation of said indexing means feeding tile into said sagger in each indexed position, carrier means operable to place loaded saggers on a conveyance, said conveyance being adapted to carry said saggers through a firing oven and then deliver them to an unloading station, an unloader operating to remove saggers from said conveyance and moving such saggers to a dump station, dump means operable to empty said saggers, and a sagger transporting means operable to transport empty saggers from said dump station to said indexing means.

4. A system as defined in claim 3 wherein said diverter, said indexing means, said feed means, said carrier means, said unloader, said dump means, and said transporting means all operate only at a rate necessary to meet the requirements of tile passing along said conveyor and each automatically stop its respective operations when the demand for its operations is not present.

5. A system for handling tiles comprising a conveyor operable to transport tiles to a loading station, indexing means at said loading station operable to position saggers having a plurality of shelves each adapted to receive tile in alignment with said conveyor, said indexing means including a sensor controlling said indexing means to progressively move said sagger to position a first shelf for loading with tile and then move a subsequent shelf into position for loading after said first shelf is loaded, and feed means at said loading station operating to feed tile onto said shelves as it moves to said position for loading, said sensor being inoperative when the top shelf moves to said loading station so that tiles are not loaded on said top shelf.

6. A system for handling tiles comprising a conveyor operable to transport tiles to a loading station, indexing means at said loading station operable to position saggers having a plurality of shelves each adapted to receive tile in alignment with said conveyor, said indexing means operating to progressively move said sagger to position a first shelf for loading with tile and then move a subsequent shelf into position for loading after said first shelf is loaded, feed means at said loading station operating to feed tile onto said shelves as it moves to said position for loading, carrier means operable to place loaded saggers on a conveyance in a predetermined arrangement, said conveyance being adapted to carry said saggers through a firing oven and then deliver them to an unloading station, an unloader operable to remove saggers from said conveyance and move them to a dump station, dump means operable to empty said saggers, and a sagger transporting means operable to transport empty saggers from said dump station to said indexing means.

7. A system according to claim 6 wherein said indexing means operates to move the top shelf of each sagger past said feed means without loading.

8. A system for handling a plurality of similar articles comprising a first continuously operating conveyor adapted to transport said articles from a first location to a second location, a second intermittently operated conveyor positioned to receive articles from said first conveyor at said second location and being adapted to transport said articles to a third location, said second conveyor operating at a higher speed than said first conveyor to provide a space between most adjacent articles passing along said second conveyor, diverter means receiving articles from said second conveyor at said third location and operating to selectively direct such articles to a plurality of locations, and control means sensing the spacing between adjacent articles carried by said second conveyor controlling the intermittent operation of said second conveyor and the operation of said diverter in a timed relationship.

9. A system according to claim 8 wherein said control means includes a photoelectric cell connected to electrically operated clutch and brake means, and said clutch and brake means controls the intermittent operation of said second conveyor.

10. A system for loading articles on a sagger having a plurality of article receiving shelves comprising an indexing conveyor operable to move said sagger and its shelves past the loading station, a gating conveyor operable to singly feed articles onto said shelves at said loading station, a drive intermittently operating said gating conveyor, first means sensing the position of a shelf and stopping said indexing conveyor when a shelf is in position to receive an article and operating said drive to start said gating conveyor, and second means sensing movement of an article onto a shelf operating to stop the drive for said gating conveyor and start said indexing conveyor to move a subsequent shelf into position for loading.

11. A system according to claim 10 wherein two similar gating conveyors are provided each operable to feed an article onto each shelf at said loading station, and said second means stops each gating conveyor individually as an article passes therefrom onto each shelf and starts said indexing conveyor only after an article is loaded onto a shelf from each gating conveyor.

12. A system for loading articles on a sagger having a plurality of article receiving shelves comprising an indexing conveyor operable to move said sagger and its shelves past the loading station, a gating conveyor operable to singly feed articles onto said shelves at said loading station, a drive intermittently operating said gating conveyor, first means sensing the position of a shelf and stopping said indexing conveyor when a shelf is in position to receive an article and operating said drive to start said gating conveyor, second means sensing movement of an article onto a shelf operating to stop the drive for said gating conveyor and start said indexing conveyor to move a subsequent shelf into position for loading, and by-pass means preventing said first means from stopping said indexing conveyor when the end of each sagger is in alignment with said gating conveyor.

13. A loading system for containers having a plurality of separate article receiving spaces comprising conveyor means operable to transport articles to a loading position, indexing means operable to move containers spaced from each other past said loading position and sequentially position said spaces in said loading position, said conveyor means including gating means operable to cause intermittent feed of articles to said loading position, said indexing means including a first sensor operable to stop said indexing means when successive empty spaces are in position to receive said articles at said loading position, said sensor also operating to cause said gating means to release an article into such empty space, said conveyor means including a second sensor operable to initiate operation of said indexing means after an article is fed into such empty space, said indexing means including control means operable to render said first sensor inoperative as the end of said container moves past said loading station.

References Cited by the Examiner

UNITED STATES PATENTS

| | | | |
|---|---|---|---|
| 1,667,714 | 5/1928 | Bacheller | 198—31 |
| 2,318,598 | 5/1943 | Davis | 53—160 |
| 2,722,354 | 11/1955 | Mapes | 53—160 X |
| 2,724,482 | 11/1955 | Francisci | 198—21 |
| 2,968,899 | 1/1961 | Holmes | 53—160 |

FOREIGN PATENTS

| | | |
|---|---|---|
| 491,388 | 9/1938 | Great Britain. |

EVON C. BLUNK, *Primary Examiner.*

EDWARD A. SROKA, *Examiner.*